United States Patent [19]

Crawford et al.

[11] Patent Number: 4,476,906
[45] Date of Patent: Oct. 16, 1984

[54] YIELDING PRESSURE BAR FOR WOOD PLANING MACHINES

[75] Inventors: William B. Crawford; Brian D. Barber, both of Greensboro, N.C.

[73] Assignee: Newman Machine Company, Inc., Greensboro, N.C.

[21] Appl. No.: 530,638

[22] Filed: Sep. 9, 1983

[51] Int. Cl.³ .............................................. B27C 1/00
[52] U.S. Cl. ................................. 144/116; 144/114 R
[58] Field of Search .............. 144/114 R, 116, 117 R, 144/128, 129, 130, 250 R, 253

[56] References Cited

U.S. PATENT DOCUMENTS

| 985,366 | 2/1911 | Orton | 144/250 R |
|---|---|---|---|
| 1,192,540 | 7/1916 | Libert | 144/250 R |
| 2,819,744 | 1/1958 | Chuet et al. | 144/116 X |
| 4,438,795 | 3/1984 | Plough | 144/116 X |

Primary Examiner—W. D. Bray

[57] ABSTRACT

A wood planar having a cutterhead with a top pressure bar in spaced horizontal relation to the cutterhead. A chipbreaker may be mounted in advance and adjacent to the cutterhead in spaced relation above a bed plate mounted for supporting a board to be planed. The improvement in the wood planar including a yielding pressure bar means for automatic cut control mounted to cooperate with the bed plate with a shaft for mounting the yielding pressure bar means and the yielding pressure bar means having at least one member pivotally mounted on the shaft. The yielding pressure bar means includes a rearwardly projecting surface for engaging a board being planed in a directed path of travel and having a forwardly projecting abutment with resilient means for urging the rearwardly projecting surface against a top pressure bar and the cutterhead while a board is being conveyed through the planar during planing.

5 Claims, 4 Drawing Figures

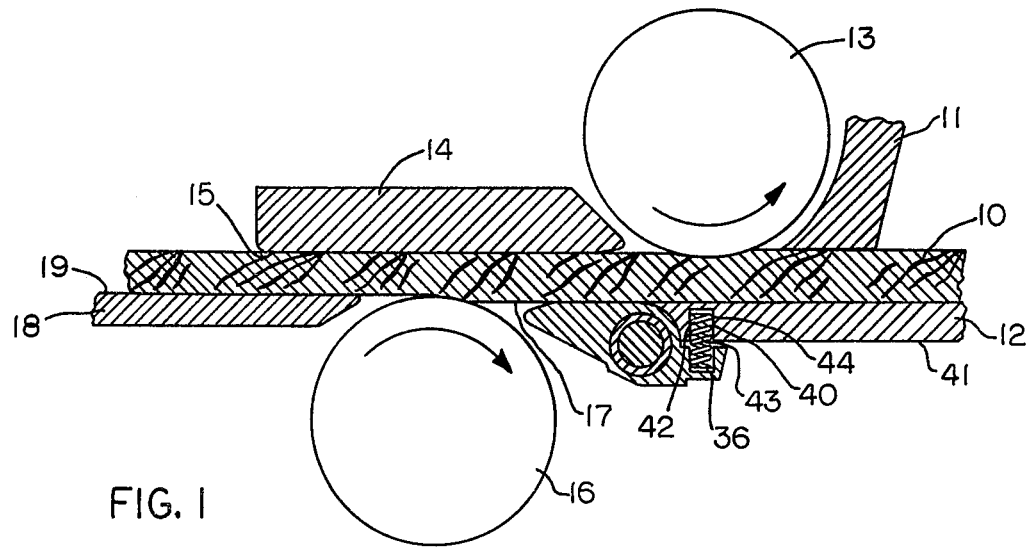
FIG. 1
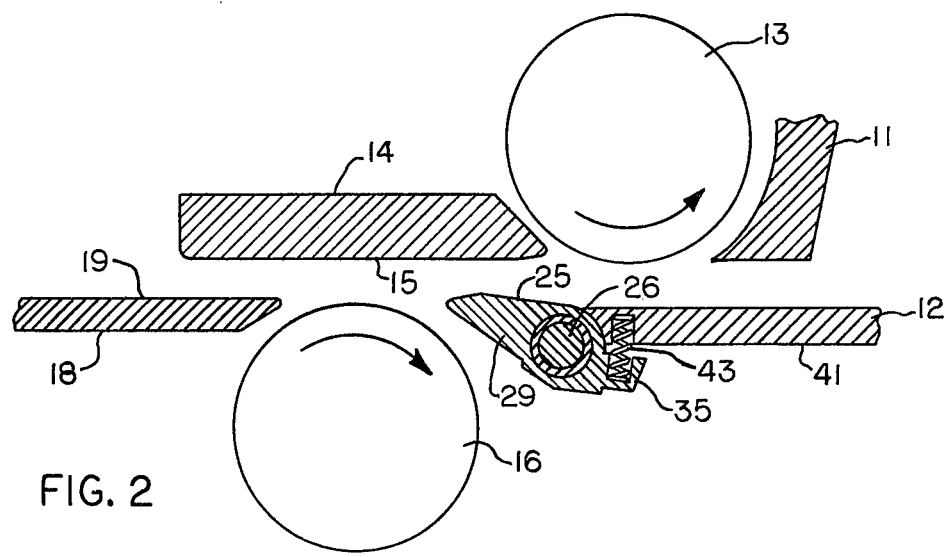
FIG. 2
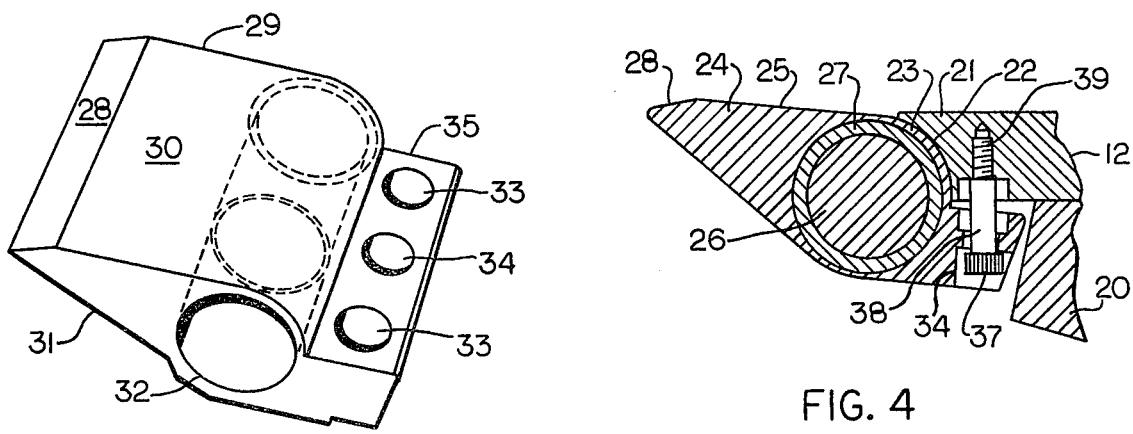
FIG. 3
FIG. 4

YIELDING PRESSURE BAR FOR WOOD PLANING MACHINES

This invention relates to an improvement in wood planers for controlling the cut for surfacing rough lumber in board lengths and planing in long lengths by eliminating "scant" lumber planing and providing more equal distribution of hit-and-miss surfaces on one or both sides of the board or lumber being planed resulting in increased yield and lumber grade improvement.

BACKGROUND AND OBJECTIVES OF THE PRESENT INVENTION

Various types of weighted and yielding sectional rolls and sectional chipbreakers have been employed in planers to work upon different thicknesses of the stock or lumber at the same time. Also, various types of pressure rollers for planers have been utilized for woodworking machines in which the planing table has separate relatively vertically adjustable parts for supporting a work piece up to and beyond an underlying rotary cutter tool during planing and a vertically adjustable thickness table which has a downwardly directed work-locating surface. However, there is absent from the prior art, in single and double planers, a yielding pressure bar that will automatically control the cut of the lumber during planing that will eliminate fixed cutting depths on at least one of the cutterheads to provide maximum yield at minimum operating cost with lumber grade improvement. Such prior patents include, among others: U.S. Pat. Nos. 317,379; 492,072; 521,297; 693,576; 785,825; 985,366; 1,059,486; 1,075,191; 1,192,540; and British Pat. No. 902,168.

Therefore, it is an objective of the present invention to provide an improved bed plate for a wood planer for yieldable displacement in conjunction with a cutterhead and a pressure bar in spaced vertical and horizontal relation. It is also an objective of the present invention to provide an improvement in a double wood planer having top and bottom cutterheads that are spaced vertically from each other with a first or top pressure bar and a chipbreaker, the improvement in a bed plate in which a yieldable pressure bar means is mounted for automatic cut control of lumber being planed with minimum adjustments to be made to the cutterheads.

Another objective of the present invention is the provision of a yieldable extension to a bed plate on a wood planer for urging lumber being planed upwardly against a first pressure bar and top cutterhead and for scant lumber planing by the bottom cutterhead with minimum adjustments.

Other objectives and many of the attendant advantages of this invention will become more readily aparent to those skilled in the wood planing art and modifications and variations are contemplated to this improvement within the scope of the appended claims.

SUMMARY OF THE INVENTION

In a double wood planer having a top cutterhead and a bottom cutterhead that is spaced vertically and horizontally from each other, a top or first pressure bar is mounted in spaced horizontal relation to the top cutterhead and in spaced vertical relation to the bottom cutterhead. A chipbreaker is positioned in advance and adjacent to the top cutterhead above the bed plate which bed plate is adjustably mounted on an inclined table and assembly. The bed plate has a series of spaced recesses therein for cooperatively receiving and supporting the improvement of a yielding pressure bar means for automatic cut control of lumber being conveyed through the double planer to cooperate with the bed plate. The yieldable pressure bar means has a shaft supported on the inclined table and assembly in which the pressure bar has a series of abutting bar members that are pivotally mounted on the shaft with each bar member having rearwardly projecting surface for engaging lumber or a board passing through the double planer in a directed path of travel. The bar members forming the yieldable pressure bar also have a forwardly projecting abutment with means for resiliently urging the rearwardly projecting surface upwardly against the first pressure bar and the top cutterhead for engaging lumber or a board being conveyed during planing in its directed path of travel. The yieldable pressure bar means is permitted to pivot, within limits, and to urge a board upwardly against the top pressure bar and top cutterhead while being planed on its bottom surface by the bottom cutterhead. A series of coil springs is spaced beneath the bed plate for cooperative reception in coil spring receiving recesses in the individual bar members for pivoting the bar member in a clockwise direction or upwardly against lumber that is being conveyed through the double planer.

BRIEF DESCRIPTION OF THE DRAWING OF A PREFERRED EMBODIMENT

FIG. 1 is a partial diagrammatic side view of a double planer illustrating the essential components in conjunction with the improvement of the yielding pressure bar in conjunction with the bed plate with a board being conveyed through the double planer and the various elements being shown at least in partial sectional view;

FIG. 2 is a view similar to FIG. 1 with the board omitted and illustrating the yieldable pressure bar means in its upward displacement;

FIG. 3 is a perspective view of a single bar member of which a series is utilized for the assembled yieldable pressure bar means; and FIG. 4 is an enlarged partial transverse sectional view of the yieldable pressure bar means mounted to the bed plate with the pressure bar member being shown in the upward position.

DETAILED DESCRIPTION OF PREFERRED EMBODIMENT OF THE INVENTION

Referring to FIGS. 1 and 2 of the drawing, there is illustrated a double planer incorporating the present invention in which only those essential components are incorporated for an understanding of the present invention since double planers are well-known in the wood working art. An indeterminate length of lumber 10 which is to be planed to the desired thickness is positioned beneath the chipbreaker 11 which exerts a downward force on the board 10. It also provides appropriate stability to the board 10 as it travels along its directed path of travel from right to left in FIG. 1. Board 10 is positioned for horizontal travel on the bed plate 12 which is positioned beneath the top cutterhead 13 which is driven by conventional means (not shown) in a counterclockwise direction in advance of the pressure bar 14 under which the board 10 which has had its top surface planed will pass beneath the bottom surface 15 of pressure bar 14 which exerts a downward force upon the board as it passes over the bottom cutterhead 16 that is driven by conventional means (not shown) in a clockwise direction to plane the bottom surface 17 of the board 10 before it engages the outfeed table 18 on which upper surface 19 the bottom surface 17 of the board will slide.

Bed plate 12 is slidably supported on an inclined table and assembly 20 with the forward portion 21 of bed plate 12 being provided with an arcuate leading edge 22 for cooperatively receiving the arcuate shoulder 23 of the wedge-shaped, rearwardly projecting surface 24 of the yielding pressure bar member 25 that is pivotally supported on the stationary shaft 26 that is mounted on the inclined table 20. Sleeve bearing 27 is press fit into the yielding pressure bar member 25 and encircles the shaft 26.

The yielding pressure bar member 25 has a downwardly extending inclined portion 28 which will assist in urging a board being planed upwardly at the trailing end of the board 10.

The yielding pressure bar 25 is preferably constituted by a series of individual bar members 29, as shown in FIG. 3, in which the upper surface 30 will engage and guide the board 10 thereover as shown in FIG. 1. The chamfered end 28 is shown in the member 29 in FIG. 3 as merging with the bottom upwardly inclined converging wall 31 on the wedge-shaped rearwardly projecting section. The shaft opening 32 in the bar member 29 will be cooperatively received on shaft 26 adjacent to and abutting other bar members to form the series constituting the yielding pressure bar member for automatic cut control to cooperate with the bed plate. Recesses 33 are provided in the forwardly projecting abutment 35 in which recesses 33 and 34 are suitably bored. Recesses 33 and 34 will cooperatively receive and retain therein a portion of a coil spring 36 with the recess 34 cooperatively receiving and supporting the head 37 of the retaining bolt 38 which is secured threadably 39 into the bed plate 12 as shown in FIG. 4. Horizontally spaced recesses 44 are provided in the undersurface 41 of bed plate 12 for cooperatively receiving spring end 42 of the spring member 43.

As shown in FIG. 1, the bar member 29, forming one of a series of members to make up the yielding pressure bar 25, is pivoted counter-clockwise by the board 10 being conveyed thereover against the force of the coil spring 43. In FIG. 2, coil spring 43 pivots the bar member 29 clockwise since there is no downward force acting upon the top surface 30 of the bar member 29. The yielding pressure bar members 29 yieldably urge a board 10 upwardly against pressure bar 14 and cutterhead 13 to plane the upper surface 45 of board 10 and to permit planing of the bottom surface 17 of the board 10 by the bottom cutterhead 16, as shown in FIG. 1.

It is further contemplated that the improved yieldable pressure bar 25 may readily be employed with a single cutterhead whether top or bottom in some applications which may not require the use of an inclined assembly and table 20 to support the yieldable pressure bar 25 in alignment with the bed plate 12. In such applications the shaft 26 may be supported on the machine frame directly or by brackets (not shown) from the bed plate 12.

Obviously, many variations may be made to the contour of the pressure bar members and disposition of the springs as well as the spring types that may be employed to provide the requisite yielding action required adjacent to the bed plate and between the top and bottom cutterheads which modifications will be apparent to those skilled in the woodworking art.

We claim:

1. A wood planer having at least one cutterhead and a bottom, a top pressure bar in spaced horizontal relation to said cutterhead, a board holddown member in advance of said cutterhead, an adjustable table and assembly having a bed plate having spaced recesses thereunder mounted thereon for supporting a board to be planed, the improvement comprising a yielding pressure bar means for automatic cut control mounted to cooperate with said bed plate, said yielding pressure bar means having a shaft supported on said adjustable table and assembly, a bar having at least one member pivotally mounted on said shaft, said bar member having a rearwardly projecting surface for engaging a board in a directed path of travel, said bar member having a forwardly projecting abutment, means for resiliently urging said rearwardly projecting surface upwardly against said first pressure bar and said cutterhead for engaging a board being conveyed through said planer during planing.

2. A wood planer as claimed in claim 1, said yielding pressure bar member forwardly projecting abutment having a cylindrical recess, and spring means mounted in said recess for urging said rearwardly projecting surface upwardly.

3. A wood planer as claimed in claim 1, said yielding pressure bar member forwardly projecting abutment having means for retaining said bar member adjacent to said bed plate and limiting pivotal displacement.

4. A wood planer as claimed in claim 1, said yielding pressure bar member rearwardly projecting surface having a substantially wedge-shaped cross-section and a downwardly extending rear edge portion out of the plane of the rearwardly projecting board-engaging surface.

5. A wood planer as claimed in claim 1, said planer having a top cutterhead and a bottom cutterhead spaced vertically and horizontally from each other, said top pressure bar being in spaced horizontal relation to said top cutterhead in spaced vertical relation to said bottom cutterhead, said board holddown member including a chipbreaker in advance and adjacent to said top cutterhead, said adjustable table and assembly being inclined, the improvement comprising a yielding pressure bar means for automatic cut control mounted to cooperate with said bed plate, said yielding pressure bar means having a shaft supported on said adjustable inclined table and assembly, a bar having at least one member pivotally mounted on said shaft, said bar member having a rearwardly projecting surface for engaging a board in a directed path of travel said bar member having a forwardly projecting abutment, means for resiliently urging said rearwardly projecting surface upwardly against said first pressure bar and said top cutterhead for engaging a board being conveyed through said planer during planing.

* * * * *